(12) United States Patent
Jacobs, II et al.

(10) Patent No.: US 10,713,394 B1
(45) Date of Patent: Jul. 14, 2020

(54) FILTERING COMPONENTS COMPATIBLE WITH A COMPUTER-MODELED STRUCTURE

(71) Applicant: Benko, LLC, New London, NH (US)

(72) Inventors: James L. Jacobs, II, Amherst, NH (US); John E. Cronin, Bonita Springs, FL (US); Justin R. Kunz, South Burlington, VT (US); Steven M. Lynch, Hudson, NH (US)

( * ) Notice: Subject to any disclaimer, the term of this patent is extended or adjusted under 35 U.S.C. 154(b) by 588 days.

(21) Appl. No.: 14/303,372

(22) Filed: Jun. 12, 2014

(51) Int. Cl.
*G06F 30/00* (2020.01)

(52) U.S. Cl.
CPC .................... *G06F 30/00* (2020.01)

(58) Field of Classification Search
CPC .................... G06F 17/50; G06T 17/00
See application file for complete search history.

(56) References Cited

U.S. PATENT DOCUMENTS

| | | | |
|---|---|---|---|
| 4,495,559 A | 1/1985 | Gelatt, Jr. et al. |
| 5,117,354 A | 5/1992 | Long |
| 5,465,221 A | 11/1995 | Merat et al. |
| 5,495,430 A | 2/1996 | Matsunari et al. |
| 5,552,995 A | 9/1996 | Sebastian |
| 5,570,291 A | 10/1996 | Dudle et al. |
| 5,655,087 A | 8/1997 | Hino et al. |
| 5,758,328 A | 5/1998 | Giovannoli |
| 5,847,971 A | 12/1998 | Ladner et al. |
| 5,870,719 A | 2/1999 | Maritzen et al. |
| 5,937,189 A | 8/1999 | Branson et al. |
| 6,031,535 A | 2/2000 | Barton |

(Continued)

FOREIGN PATENT DOCUMENTS

| | | |
|---|---|---|
| WO | 154476 A2 | 8/2001 |
| WO | 171626 A2 | 9/2001 |

(Continued)

OTHER PUBLICATIONS

Defining Lead Time for APS Planning; http://t3.apptrix.com/syteline/Language/en-US/Other/Process/Defining_Lead_Time.htm.

(Continued)

*Primary Examiner* — Rehana Perveen
*Assistant Examiner* — Steven W Crabb
(74) *Attorney, Agent, or Firm* — Caldwell Intellectual Propert

(57) ABSTRACT

Systems, methods, and software for filtering components, such as hardware components, compatible with computer-modeled structures are presented. A compatible components system provides selection methods that present components compatible with computer-aided design (CAD) models designed in computer modeling software. The system executes methods designed to filter components made available to designers using attribute information of the features and attribute information of the components. Designers may interact with the compatibility methods numerous times, narrowing components through a series or number of filtering steps until a desired compatible component is easily selected. The computer modeling software may include graphical user interfaces for selecting component source locations, filtering types of components presented by the system, and adding components to CAD models.

11 Claims, 9 Drawing Sheets

(56) References Cited

U.S. PATENT DOCUMENTS

| | | | |
|---|---|---|---|
| 6,112,133 A | 8/2000 | Fishman | |
| 6,295,513 B1 | 9/2001 | Thackston | |
| 6,341,271 B1 | 1/2002 | Salvo et al. | |
| 6,343,285 B1 | 1/2002 | Tanaka et al. | |
| 6,542,937 B1* | 4/2003 | Kask | G05B 19/4097 700/182 |
| 6,611,725 B1 | 8/2003 | Harrison | |
| 6,647,373 B1 | 11/2003 | Carlton-Foss | |
| 6,701,200 B1 | 3/2004 | Lukis et al. | |
| 6,750,864 B1 | 6/2004 | Anwar | |
| 6,834,312 B2 | 12/2004 | Edwards et al. | |
| 6,836,699 B2 | 12/2004 | Lukis et al. | |
| 6,859,768 B1 | 2/2005 | Wakelam et al. | |
| 6,917,847 B2 | 7/2005 | Littlejohn et al. | |
| 6,922,701 B1 | 7/2005 | Ananian et al. | |
| 7,006,084 B1 | 2/2006 | Buss et al. | |
| 7,058,465 B2 | 6/2006 | Emori et al. | |
| 7,072,729 B2* | 7/2006 | McCall, II | G06F 17/50 700/117 |
| 7,079,990 B2* | 7/2006 | Haller | G05B 19/41805 345/420 |
| 7,085,687 B2 | 8/2006 | Eckenwiler et al. | |
| 7,089,082 B1 | 8/2006 | Lukis et al. | |
| 7,123,986 B2 | 10/2006 | Lukis et al. | |
| 7,134,096 B2 | 11/2006 | Brathwaite et al. | |
| 7,299,101 B2 | 11/2007 | Lukis et al. | |
| 7,305,367 B1 | 12/2007 | Hollis et al. | |
| 7,327,869 B2 | 2/2008 | Boyer | |
| 7,343,212 B1 | 3/2008 | Brearley et al. | |
| 7,359,886 B2 | 4/2008 | Sakurai et al. | |
| 7,366,643 B2 | 4/2008 | Verdura et al. | |
| 7,369,970 B2 | 5/2008 | Shimizu et al. | |
| 7,418,307 B2 | 8/2008 | Katircioglu | |
| 7,467,074 B2 | 12/2008 | Faruque et al. | |
| 7,496,487 B2 | 2/2009 | Wakelam et al. | |
| 7,496,528 B2 | 2/2009 | Lukis et al. | |
| 7,499,871 B1 | 3/2009 | McBrayer et al. | |
| 7,523,411 B2 | 4/2009 | Carlin | |
| 7,526,358 B2 | 4/2009 | Kawano et al. | |
| 7,529,650 B2 | 5/2009 | Wakelam et al. | |
| 7,565,139 B2 | 7/2009 | Neven, Sr. et al. | |
| 7,565,223 B2 | 7/2009 | Moldenhauer et al. | |
| 7,567,849 B1 | 7/2009 | Trammell et al. | |
| 7,568,155 B1 | 7/2009 | Axe et al. | |
| 7,571,166 B1 | 8/2009 | Davies et al. | |
| 7,574,339 B2 | 8/2009 | Lukis et al. | |
| 7,590,466 B2 | 9/2009 | Lukis et al. | |
| 7,590,565 B2 | 9/2009 | Ward et al. | |
| 7,603,191 B2 | 10/2009 | Gross | |
| 7,606,628 B2 | 10/2009 | Azuma | |
| 7,630,783 B2 | 12/2009 | Walls-Manning et al. | |
| 7,656,402 B2 | 2/2010 | Abraham et al. | |
| 7,689,936 B2 | 3/2010 | Rosel | |
| 7,733,339 B2 | 6/2010 | Laning et al. | |
| 7,747,469 B2 | 6/2010 | Hinman | |
| 7,748,622 B2 | 7/2010 | Schon et al. | |
| 7,761,319 B2 | 7/2010 | Gil et al. | |
| 7,822,682 B2 | 10/2010 | Arnold et al. | |
| 7,836,573 B2 | 11/2010 | Lukis et al. | |
| 7,840,443 B2 | 11/2010 | Lukis et al. | |
| 7,908,200 B2 | 3/2011 | Scott et al. | |
| 7,957,830 B2 | 6/2011 | Lukis et al. | |
| 7,979,313 B1 | 7/2011 | Baar | |
| 7,993,140 B2 | 8/2011 | Sakezles | |
| 8,000,987 B2 | 8/2011 | Hickey et al. | |
| 8,024,207 B2 | 9/2011 | Ouimet | |
| 8,140,401 B2 | 3/2012 | Lukis et al. | |
| 8,170,946 B2 | 5/2012 | Blair et al. | |
| 8,175,933 B2 | 5/2012 | Cook, Jr. et al. | |
| 8,180,396 B2 | 5/2012 | Athsani et al. | |
| 8,206,153 B2* | 6/2012 | Suttin | A61C 8/00 433/215 |
| 8,209,327 B2 | 6/2012 | Danish et al. | |
| 8,239,284 B2 | 8/2012 | Lukis et al. | |
| 8,249,329 B2 | 8/2012 | Silver | |
| 8,271,118 B2 | 9/2012 | Pietsch et al. | |
| 8,275,583 B2 | 9/2012 | Devarajan et al. | |
| 8,295,971 B2 | 10/2012 | Krantz | |
| 8,417,478 B2 | 4/2013 | Gintis et al. | |
| 8,441,502 B2 | 5/2013 | Reghetti et al. | |
| 8,515,820 B2 | 8/2013 | Lopez et al. | |
| 8,554,250 B2 | 10/2013 | Linaker | |
| 8,571,298 B2 | 10/2013 | McQueen et al. | |
| 8,595,171 B2 | 11/2013 | Qu | |
| 8,645,107 B2* | 2/2014 | Gibson | G06F 17/50 345/419 |
| 8,700,185 B2 | 4/2014 | Yucel et al. | |
| 8,706,607 B2 | 4/2014 | Sheth et al. | |
| 8,768,651 B2 | 7/2014 | Bhaskaran et al. | |
| 8,798,324 B2 | 8/2014 | Conradt | |
| 8,806,398 B2 | 8/2014 | Brathwaite et al. | |
| 8,830,267 B2 | 9/2014 | Brackney | |
| 8,849,636 B2 | 9/2014 | Becker et al. | |
| 8,861,005 B2 | 10/2014 | Grosz | |
| 8,874,413 B2 | 10/2014 | Mulligan et al. | |
| 8,923,650 B2 | 12/2014 | Wexler | |
| 8,977,558 B2 | 3/2015 | Nielsen et al. | |
| 9,037,692 B2 | 5/2015 | Ferris | |
| 9,055,120 B1 | 6/2015 | Firman | |
| 9,106,764 B2 | 8/2015 | Chan et al. | |
| 2001/0023418 A1 | 9/2001 | Suzuki et al. | |
| 2001/0047251 A1 | 11/2001 | Kemp | |
| 2002/0065790 A1 | 5/2002 | Oouchi | |
| 2002/0087440 A1 | 7/2002 | Blair et al. | |
| 2002/0099579 A1 | 7/2002 | Stowell et al. | |
| 2002/0107673 A1 | 8/2002 | Haller et al. | |
| 2002/0152133 A1 | 10/2002 | King et al. | |
| 2003/0018490 A1 | 1/2003 | Magers et al. | |
| 2003/0069824 A1 | 4/2003 | Menninger | |
| 2003/0078846 A1 | 4/2003 | Burk et al. | |
| 2003/0139995 A1 | 7/2003 | Farley | |
| 2003/0149500 A1 | 8/2003 | Faruque et al. | |
| 2003/0163212 A1 | 8/2003 | Smith et al. | |
| 2003/0172008 A1 | 9/2003 | Hage et al. | |
| 2003/0212610 A1 | 11/2003 | Duffy et al. | |
| 2003/0220911 A1 | 11/2003 | Tompras | |
| 2004/0008876 A1 | 1/2004 | Lure | |
| 2004/0113945 A1 | 6/2004 | Park et al. | |
| 2004/0195224 A1 | 10/2004 | Kanodia et al. | |
| 2005/0055299 A1 | 3/2005 | Chambers et al. | |
| 2005/0125092 A1 | 6/2005 | Lukis et al. | |
| 2005/0144033 A1 | 6/2005 | Vreeke et al. | |
| 2005/0171790 A1 | 8/2005 | Blackmon | |
| 2005/0251478 A1 | 11/2005 | Yanavi | |
| 2005/0273401 A1 | 12/2005 | Yeh et al. | |
| 2006/0085322 A1 | 4/2006 | Crookshanks | |
| 2006/0185275 A1 | 8/2006 | Yatt | |
| 2006/0253214 A1 | 11/2006 | Gross | |
| 2007/0016437 A1 | 1/2007 | Elmufdi et al. | |
| 2007/0067146 A1 | 3/2007 | Devarajan et al. | |
| 2007/0073593 A1 | 5/2007 | Perry et al. | |
| 2007/0112635 A1 | 5/2007 | Loncaric | |
| 2007/0179759 A1* | 8/2007 | Mangon | G06F 17/5004 703/1 |
| 2007/0198231 A1 | 8/2007 | Walch | |
| 2008/0120086 A1 | 5/2008 | Lilley et al. | |
| 2008/0183614 A1 | 7/2008 | Gujral et al. | |
| 2008/0269942 A1* | 10/2008 | Free | G06F 17/50 700/182 |
| 2008/0281678 A1 | 11/2008 | Keuls et al. | |
| 2009/0058860 A1 | 3/2009 | Fong et al. | |
| 2009/0208773 A1 | 8/2009 | DuPont | |
| 2009/0299799 A1 | 12/2009 | Racho et al. | |
| 2009/0319388 A1 | 12/2009 | Yuan et al. | |
| 2011/0040542 A1 | 2/2011 | Sendhoff et al. | |
| 2011/0047140 A1 | 2/2011 | Free | |
| 2011/0054655 A1* | 3/2011 | Krantz | G05B 19/4097 700/98 |
| 2011/0209081 A1 | 8/2011 | Chen et al. | |
| 2011/0213757 A1 | 9/2011 | Bhaskaran et al. | |
| 2012/0016678 A1 | 1/2012 | Gruber et al. | |
| 2012/0072299 A1 | 3/2012 | Sampsell | |
| 2012/0230548 A1 | 9/2012 | Calman et al. | |
| 2012/0316667 A1 | 12/2012 | Hartloff | |

(56) References Cited

U.S. PATENT DOCUMENTS

| | | | |
|---|---|---|---|
| 2013/0055126 A1 | 2/2013 | Jackson | |
| 2013/0097259 A1 | 4/2013 | Li | |
| 2013/0100128 A1 | 4/2013 | Steedly et al. | |
| 2013/0103369 A1* | 4/2013 | Huynh | G06F 17/5018 703/2 |
| 2013/0138529 A1 | 5/2013 | Hou | |
| 2013/0144566 A1 | 6/2013 | De Biswas | |
| 2013/0166470 A1 | 6/2013 | Grala et al. | |
| 2013/0218961 A1 | 8/2013 | Ho | |
| 2013/0293580 A1 | 11/2013 | Spivack | |
| 2013/0297320 A1 | 11/2013 | Buser et al. | |
| 2013/0297460 A1 | 11/2013 | Spivack | |
| 2013/0311914 A1 | 11/2013 | Daily | |
| 2013/0325410 A1 | 12/2013 | Jung et al. | |
| 2014/0042136 A1 | 2/2014 | Daniel et al. | |
| 2014/0067333 A1 | 3/2014 | Rodney et al. | |
| 2014/0075342 A1 | 3/2014 | Corlett | |
| 2014/0098094 A1 | 4/2014 | Neumann et al. | |
| 2014/0157579 A1 | 6/2014 | Chhabra et al. | |
| 2014/0207605 A1 | 7/2014 | Allin et al. | |
| 2014/0229316 A1 | 8/2014 | Brandon | |
| 2014/0279177 A1 | 9/2014 | Stump | |
| 2014/0379119 A1 | 12/2014 | Sciacchitano et al. | |
| 2014/0379309 A1* | 12/2014 | Banta | G06F 17/50 703/1 |
| 2015/0055085 A1 | 2/2015 | Fonte et al. | |
| 2015/0066189 A1 | 3/2015 | Mulligan et al. | |
| 2015/0127480 A1 | 5/2015 | Herrman et al. | |
| 2015/0186555 A1* | 7/2015 | Divekar | G06F 17/50 703/1 |
| 2015/0234377 A1 | 8/2015 | Mizikovsky | |

FOREIGN PATENT DOCUMENTS

| | | | |
|---|---|---|---|
| WO | 2001077781 | A2 | 10/2001 |
| WO | 2006086332 | A2 | 8/2006 |
| WO | 2007067248 | A2 | 6/2007 |
| WO | 2011139630 | A1 | 11/2011 |
| WO | 2011140646 | | 11/2011 |
| WO | 2011140646 | A1 | 11/2011 |
| WO | 2013058764 | A1 | 4/2013 |
| WO | 2014152396 | A2 | 9/2014 |

OTHER PUBLICATIONS

"Quartiles." Mathisfun.com. Web. <https://www.mathsisfun.com/data/quartiles.html>. Archive. <https://web.archive.org/web/20100909011751/http://www.mathsisfun.com/data/quartiles.html>.

Wu et al. Interactive 3D Geometric Modelers with 2D UI, 2002, State University of Campinas, www.dca.fee.unicamp.br, Sao Paulo, Brazil; 2002, 8 pages.

"Upload Your Photos, Print a 3D Model with hypr3D." SolidSmack. http://www.solidsmack.com/cad-design-news/hypr3d-photo-video-3d-print/; last accessed on Oct. 13, 2015.

"123D Catch." Autodesk. http://apps.123dapp.com/catch/.

Rothganger et al. "3D Object Modeling and Recognition from Photographs and Image Sequences." Toward Category-Level Object Recognition. 2006, pp. 105-126, vol. 4170 of the series Lecture Notes in Computer Science. Springer Berlin Heidelberg.

Dealer Information Systems Corporation. "Parts Inventory." http://dis-corp.com/content/agriculture/inventory/parts-inventory.

EMachineShop. "Emachineshop Features." http://www.emachineshop.com/machine-shop/Features/page518.html.

Retrieved from:http://www.solidworks.com/sw/products/3d-cad/manufacturing-cost-estimation-quoting.htm p. 1: Automatic Manufacturing Cost Estimation Overview; Solidworks; 2015.

Retrieved from: http://www.gom.com/fileadmin/user_upload/industries/touch_probe_fixtures_EN.pdf; Application Example: Quality Control, Online Calibration and Validation of Fixtures, Jigs and Gauges. GOM mbH, 2008.

http://citeseerx.ist.psu.edu/viewdoc/download?doi=10.1.1.194.7785&rep=rep1&type=pdf Kim, Jin Baek, and Arie Segev. "A web services-enabled marketplace architecture for negotiation process management." Decision Support Systems 40.1 (2005): 71-87.

Jaiswal, Ashutosh et al., "Design and Implementation of a Secure Multi-Agent Marketplace", Elsevier Science, pp. 1-23, Jun. 3, 2004; http://magnet.cs.umn.edu/papers/Jaiswal04cera.pdf.

http://www.computer.org/csdl/proceedings/hicss/2005/2268/01/22680038.pdf Bui, Tung, and Alexandre Gachet. "Web services for negotiation and bargaining in electronic markets: Design requirements and implementation framework." System Sciences, 2005. HICSS'05.

http://www.bridgelinedigital.com/File%20Library/Repository/eCommerce/Sample-eCommerce-RFP-Template_Bridgeline-Digital.pdf. Sample RFP Template: Ecommerce Platform, Bridgeline Digital, 2014.

Matchbook, Tealbook, http://www.matchbookinc.com/ Sep. 28, 2015.

3Diligent, Source Smarter, http://www.3diligent.com/customer.html; Sep. 28, 2015.

Dassault Systemes, Brochure, Mar. 24, 2010: New Features Type3ToCatia http://www.type3.us/content/download/2202/405535/file/New%20Feature_Type3ToCatia_2010_US%20old.pdf.

Xue, S., X. Y. Kou, and S. T. Tan. "Natural voice-enabled CAD: modeling via natural discourse." Computer-Aided Design and Applications 6.1 (2009): 125-136.

Kou, X. Y., S. K. Xue, and S. T. Tan. "Knowledge-guided inference for voice-enabled CAD." Computer-Aided Design 42.6 (2010): 545-557.

Sharma, Anirudh, et al. "MozArt: a multimodal interface for conceptual 3D modeling." Proceedings of the 13th international conference on multimodal interfaces. ACM, 2011.

Sorpas ("User Manual,", Swanted Software and Engineering Aps, 2011 (120 pages)).

U.S. Appl. No. 14/267,447, Aug. 5, 2015, Office Action.
U.S. Appl. No. 14/197,922, Nov. 26, 2014, Office Action.
U.S. Appl. No. 14/197,922, Apr. 27, 2015, Response to Office Action.
U.S. Appl. No. 14/197,922, May 15, 2015, Office Action.
U.S. Appl. No. 14/267,447, Jun. 18, 2015, Response to Office Action.
U.S. Appl. No. 14/263,665, Oct. 8, 2015, Office Action.
U.S. Appl. No. 14/053,222, Jan. 29, 2016, Office Action.
U.S. Appl. No. 14/311,943, Apr. 27, 2016, Office Action.
U.S. Appl. No. 14/486,550, May 26, 2016, Office Action.
U.S. Appl. No. 14/060,033, Jun. 15, 2016, Office Action.
U.S. Appl. No. 14/172,462, Jul. 6, 2016, Office Action.
U.S. Appl. No. 14/053,222, Jul. 29, 2016, Response to Office Action.
U.S. Appl. No. 14/185,204, Jul. 29, 2016, Office Action.
U.S. Appl. No. 14/062,947, Sep. 16, 2016, Office Action.
U.S. Appl. No. 14/060,033, filed Oct. 22, 2013.
U.S. Appl. No. 14/053,222, filed Oct. 14, 2013.
U.S. Appl. No. 14/172,462, filed Oct. 16, 2013.
U.S. Appl. No. 14/062,947, filed Oct. 25, 2013.
U.S. Appl. No. 14/172,404, filed Feb. 4, 2014.
U.S. Appl. No. 14/303,372, filed Jun. 12, 2014.
U.S. Appl. No. 14/185,204, filed Feb. 20, 2014.
U.S. Appl. No. 14/195,391, filed Mar. 3, 2014.
U.S. Appl. No. 14/246,254, filed Apr. 7, 2014.
U.S. Appl. No. 14/229,008, filed Mar. 28, 2014.
U.S. Appl. No. 14/197,922, filed Mar. 5, 2014.
U.S. Appl. No. 14/263,665, filed Apr. 28, 2014.
U.S. Appl. No. 14/267,447, filed May 1, 2014.
U.S. Appl. No. 14/311,943, filed Jun. 23, 2014.

* cited by examiner

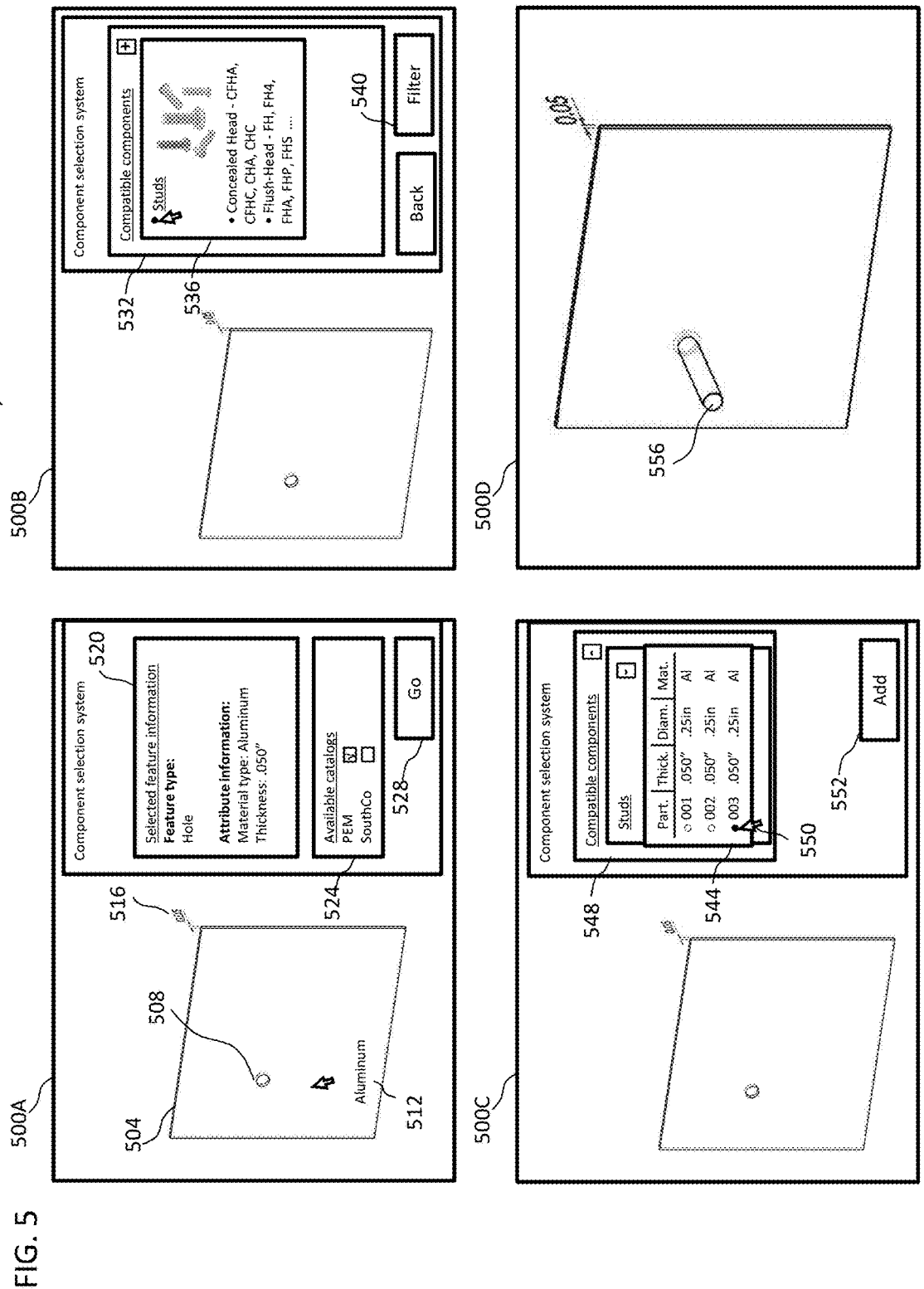

FIG. 6  Stud library 600

| Thread Size | Type Fastener Material Steel | Type Fastener Material Stainless Steel | Type Fastener Material Aluminum | Thread Code | 250 | 312 | 375 | 500 | 625 | 750 | 875 | 1.00 | 1.25 | 1.50 | Min. Sheet Thickness (1) | Hole Size in Sheet +.003 -.000 | Max. Hole in Attach. Parts | H ±.015 | S Max. (2) | Min. Dist. Hole ℄ to Edge |
|---|---|---|---|---|---|---|---|---|---|---|---|---|---|---|---|---|---|---|---|---|
| .086-56 (#2-56) | FH | FHS | — | 256 | 4 | 5 | 6 | 8 | 10 | 12 | — | — | — | — | .040 | .085 | .105 | .144 | .075 | .187 |
| .112-40 (#4-40) | FH | FHS | FHA | 440 | 4 | 5 | 6 | 8 | 10 | 12 | 14 | — | 20 | — | .040 | .111 | .135 | .176 | .085 | .219 |
| .138-32 (#6-32) | FH | FHS | FHA | 632 | 4 | 5 | 6 | 8 | 10 | 12 | 14 | 16 | 20 | 24 | .040 | .137 | .160 | .206 | .090 | .250 |
| .164-32 (#8-32) | FH | FHS | FHA | 832 | 4 | 5 | 6 | 8 | 10 | 12 | 14 | 16 | 20 | 24 | .040 | .163 | .185 | .237 | .090 | .281 |
| .190-24 (#10-24) | FH | FHS | FHA | 024 | — | 5 | 6 | 8 | 10 | 12 | 14 | 16 | 20 | 24 | .040 | .189 | .210 | .256 | .100 | .281 |
| .190-32 (#10-32) | FH | FHS | FHA | 032 | — | 5 | 6 | 8 | 10 | 12 | 14 | 16 | 20 | 24 | .040 | .189 | .210 | .256 | .100 | .281 |
| .250-20 (1/4-20) | FH | FHS | FHA | 0420 | — | — | 6 | 8 | 10 | 12 | 14 | 16 | 20 | 24 | .062 | .249 | .270 | .337 | .135 | .312 |
| .313-18 (5/16-18) | FH | FHS | — | 0518 | — | — | — | 8 | 10 | 12 | 14 | 16 | 20 | 24 | .093 | .311 | .333 | .376 | .160 | .375 |

Length Code "L" ±.015 (Length Code in 16ths of an inch)

FIG. 7

Aluminum stud listing 700

| Type | Thread Size | Lengths | | | | Hole Size |
|---|---|---|---|---|---|---|
| | | .250 | .375 | .500 | 1.00 | |
| FHA440 | 4-40 | 4 | 6 | 8 | 16 | .111 |
| FHA632 | 6-32 | 4 | 6 | 8 | 16 | .137 |
| FHA832 | 8-32 | 4 | 6 | 8 | 16 | .163 |
| FHA024 | 10-24 | NA | 6 | 8 | 16 | .189 |
| ... | ... | ... | ... | ... | ... | ... |

☐ Change hole size geometry based on selected component

700A ial structure.

FILTERING COMPONENTS COMPATIBLE WITH A COMPUTER-MODELED STRUCTURE

FIELD OF THE INVENTION

The present invention generally relates to the field of computer-aided design. In particular, the present invention is directed to filtering components compatible with a computer-modeled structure.

BACKGROUND

The placement of components within structures or structures represented by computer models is a well-known practice used to increase the design possibilities of a particular structure or computer model. Components are often standardized and produced in large quantities rather than being created custom for every size and application. Presently, 3D computer-aided design (CAD) programs allow designers to import the models of components from supplier catalogs. Designers often create features that do not match standard components, or choose standard components that do not match the features present within the computer model. For example, discrepancies between the dimensions required of components and the dimensions present within a computer model may cause problems. Time is wasted when a designer sends a design to a manufacturer without realizing the discrepancy exists. If noticed, the manufacturer must then communicate to the designer a request that the design be fixed before fabrication can occur. If unnoticed, the fabrication starts and must be halted to correct the discrepancy, resulting in additional costs and lead-time to the manufacturer.

SUMMARY OF THE DISCLOSURE

In one implementation, the present disclosure is directed to a method of assisting a designer with selecting a component compatible with a feature of a structure represented in a computer model, the method being carried out by a compatible components system programmed to carry out the steps of the method. The method includes receiving an identification of the feature of the structure with which the component is to be associated; retrieving attribute information of the feature; from among a plurality of candidate components, identifying at least one component compatible with the feature of the structure as a function of the attribute information of the feature and attribute information of the plurality of candidate components; and displaying an indication of the at least one component compatible with the feature of the structure.

In another implementation, the present disclosure is directed to a method of assisting a designer with selecting a component compatible with a feature of a structure represented in a computer model, the method being carried out by a compatible components system programmed to carry out the steps of the method. The method includes receiving an identification of the feature of the structure with which the component is to be associated; retrieving attribute information of the feature; from among a plurality of candidate components, identifying at least one component compatible with the feature of the structure as a function of the attribute information of the feature and attribute information of the plurality of candidate components; and transmitting an indication of the at least one component compatible with the feature of the structure to computer modeling software.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein:

FIG. 5 is a series of representative screenshots depicting various aspects of an exemplary user interface that may be presented to designers or other users of a compatible components system;

FIG. 6 is a depiction of an exemplary component library of self-clinching studs that may be stored in a compatible components system;

FIG. 7 is a depiction of an exemplary listing of aluminum studs that may be made available to designers by a compatible components system;

DETAILED DESCRIPTION

Aspects of the present invention include systems, methods, and software for filtering components compatible with computer-modeled structures. In certain embodiments, a compatible components system made in accordance with the present invention provides selection methods that present components compatible with computer-aided design (CAD) models designed in computer modeling software. In certain embodiments, the computer modeling software includes graphical user interfaces for, among other things, selecting component source locations, filtering types of components presented by the system, and adding components to CAD models.

In an illustrative operation of a compatible components system of the present disclosure, a designer may specify features or structures where components may be added to the CAD model. The system may then execute one or more methods designed to filter components made available to the designer using attribute information of the features and attribute information of the components. A feature may be a geometric representation of a part of a structure or an entire structure, which may be created with computer modeling software and may be embodied by surfaces, edges, and/or mounting holes, among others. A designer may interact with the compatibility methods numerous times, narrowing components through a series or number of filtering steps until a desired compatible component is easily selected.

Figure 1:
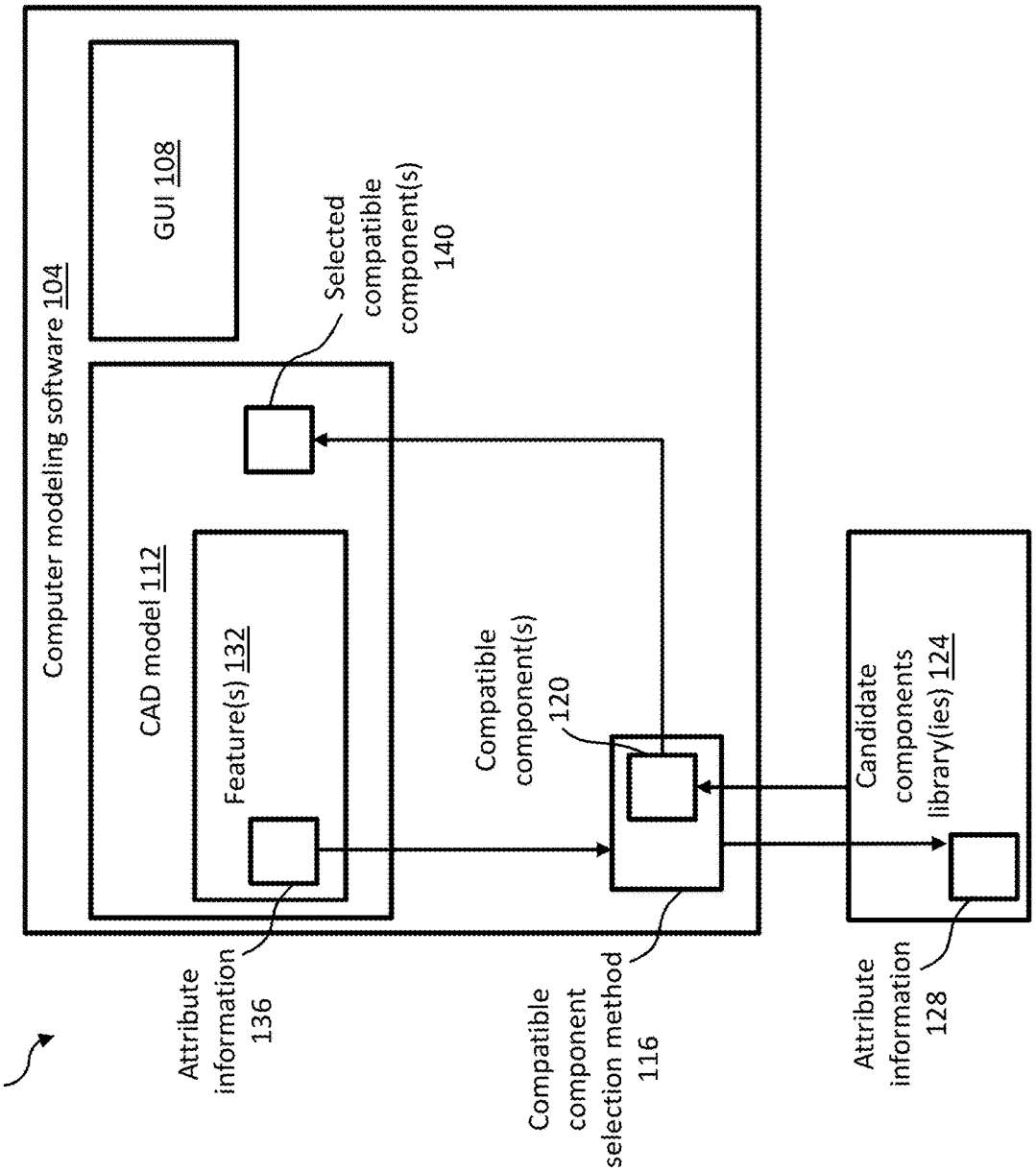
FIG. 1 is a high-level block diagram of a compatible components system made in accordance with the present disclosure.

FIG. 1 illustrates an exemplary compatible components system 100 of the present invention, which may be used for assisting designers with the selecting of components (e.g., hardware components, such as fasteners, nuts, studs, rivets, bolts, pins, screws, washers, hooks, cable tie-mounts, etc.) that are compatible with structures (e.g., pieces of sheet metal, solid cubes, cylindrical pipes, or assemblies of various parts such as vehicles, apparel, among others), which may be designed in computer modeling software. Compatible components system 100 may achieve one or more aspects of the present invention by dynamically filtering the components made available to designers through computer modeling software during the designing of structures. System 100 may dynamically filter components using information gathered from the computer model of the structure under design, as will be described in further detail below.

Illustrative hardware components that may be utilized in the present invention may be found in supplier hardware libraries such as the PEM® hardware catalog (available from Penn Engineering, Danboro, Pa.), the SOUTHCO product library (available from Southco, Inc., Concordville, Pa.), or the MCMASTER hardware catalog (available from McMaster-Carr Supply Company, Elmhurst, Ill.), for example. Components found in such catalogs may be provided in virtualized forms to designers or other users of computer modeling software as further described herein. Specification data information associated with said components, referred to herein as attribute information, may be provided to achieve benefits of the present invention.

As illustrated in FIG. 1, compatible components system 100 may include computer modeling software 104, such as a computer-aided design (CAD) program, that one or more designers may utilize to design structures represented in computer models, select components compatible with features of structures, and/or modify computer models to include and associate components with features of structures, among others things. Computer modeling software 104 may comprise any CAD software designed and configured to provide at least the functionalities described herein in any suitable combination, as well as to provide other functionalities conventionally associated with CAD software. As those skilled in the art will readily appreciate, computer modeling software 104 may reside on and/or be executed by any one or more pieces of computing hardware as particular configurations and implementations of the invention may require. Fundamentally, there is no limitation on the requirements of computer modeling software 104 as long as it is able to perform one or more of the functionalities describe herein. Further, it is noted that the term "program" as used in "CAD program" is not intended to limit the implementation of the underlying functionality to any particular arrangement of the underlying software instructions, such as in a self-contained executable file. On the contrary, the term "program" is used merely to refer to one or more functionalities that a designer can implement in working with, for example, one or more CAD models. In order to enable designers to interact with computer modeling software 104, the computer modeling software may include a graphical user interface (GUI) 108, which may be operable to display, for example, one or more CAD models of structures, features of structures, attributes of features, hardware components, etc.

As alluded to above, computer modeling software 104 may operate on or otherwise utilize one or more CAD models, such as CAD model 112, which may comprise a computerized representation of a structure designed within the computer modeling software and/or another CAD program or application. CAD model 112 may include, for example, a series of lines, arcs, points, etc., and/or other information, such as detailed manufacturing information and/or specification data, associated with a structure to be fabricated. For example, CAD model 112 may comprise a 3D model created in computer modeling software 104 or imported from another program or source. Computer modeling software 104 may be designed and configured to provide a compatible component selection method 116, which may provide one or more designers utilizing computer modeling software 104 with components that are compatible with, and thus may be included in, the design of the structure. In some embodiments, method 116 may include logic that automatedly determines compatibility between components and input structural features. For example, the logic may be implemented in the form of rules that define conditions in which components may be considered compatible with structural features. Illustrative rules that may be implemented as part of method 116 will be further described hereinbelow.

In one embodiment of system 100, compatible component selection method 116 may be implemented as a software component of computer modeling software 104. For example, method 116 may be implemented in the form of a plug-in module that adds application-level functionality to software 104. By way of another example, method 116 may be implemented as part of the executable code of software 104. In other configurations, method 116 may be implemented in a hosted software service model, in which case the method may be available to multiple instantiations of computer modeling software 104 over a network, such as the Internet.

Compatible component selection method 116 may source or retrieve one or more compatible components 120 from one or more candidate component libraries 124. Each library 124 may comprise one or more databases residing on, for example, a server, a hard drive, a compact disc, a flash drive, and/or cloud storage, among other known data storage devices/services. In some embodiments, each library 124 may include one or more categories of candidate components. Categories that may be present in library 124 may include, for example, nuts, studs, pins, screws, cable tie-mounts, fasteners, hooks, motors, buttons, drawer slides, and/or connectors. Each category may include one or more subcategories of components. For example, a category of nuts within library 124 may contain floating, blind, standard profile, flush, miniature, locking thread, and/or right angle nuts. Further, each subcategory may include one or more additional subcategories and/or one or more component parts. It is expressly contemplated that library 124 may contain virtually any number of levels in a categorical hierarchy of components.

Component library 124 may further include attribute information 128 associated with candidate components contained therein. As used herein, attribute information refers to technical specification information that may prevent a fabricator from fabricating a structure due to incompatibility between the component and a structural feature. Attribute information may consist of attribute fields (i.e., properties) and attribute values. For example, nut attribute fields may include thread size, recommended minimum sheet thickness, hole size in sheet, maximum shank length, minimum distance hole to edge, minimum sheet hardness, and/or material type. Generally speaking, while attribute fields may remain consistent across specific categories or subcategories of components, attribute values of component subcategories and/or individual component parts may vary. For example, in a component library of self-clinching studs for stainless steel sheets, each stud may contain a unique hole size in sheet attribute value.

In one embodiment, system 100 may be configured such that computer modeling software 104 and component library 124 are executed and stored on the same computing device, in which case the software and library may be operatively connected via a local bus. In other embodiments, system 100 may be configured such that software 104 and library 124 are executed and stored on separate computing devices (e.g., in a distributed computing model) and operatively connected via a network (e.g., local area network, wide area network, and/or Internet connection).

CAD model 112 may include one or more features 132 that are added, specified, or otherwise associated with the model, for example, as the structure is created. In the context of the present disclosure, features 132 refer to distinctive attribute(s) or aspect(s) of CAD model 112 that may receive one or more components. Examples of features include discrete pieces of structural geometry, such as a face, a hole, a slot, and an edge of a structure.

CAD model 112 may further include attribute information 136 associated with the one or more features contained therein. As described hereinabove, attribute information may include attribute fields and attribute values. For example, the attributes of a given feature may be characterized as non-geometric, such as the material type associated with the feature; geometric, such as the material thickness or diameter associated with the feature; and/or whether features are part of an assembly, among others.

CAD model 112 may further include one or more selected compatible component(s) 140, such as a geometric representation of selected components. Each component contained within or specified by the model may include geometric information (e.g., a series of lines, arcs, points, etc.) and non-geometric information (e.g., attribute information such as material type, thread size, number of pins), for example.

In some embodiments in which CAD model 112 may be represented as one or more computer-aided design (CAD) files, for example, method 116 may write geometric and/or non-geometric information regarding the selected compatible component(s) 140 directly into such files. In other embodiments, method 116 may write pointers or otherwise dynamically link the information and CAD files, which enables dynamically updating the information in the CAD model if and when information in library 124 changes. Those skilled in the art will recognize that these two techniques represent exemplary ways in which components may be associated with hardware and that other suitable association methods may be utilized in accordance with other embodiments of the invention.

Figure 2:
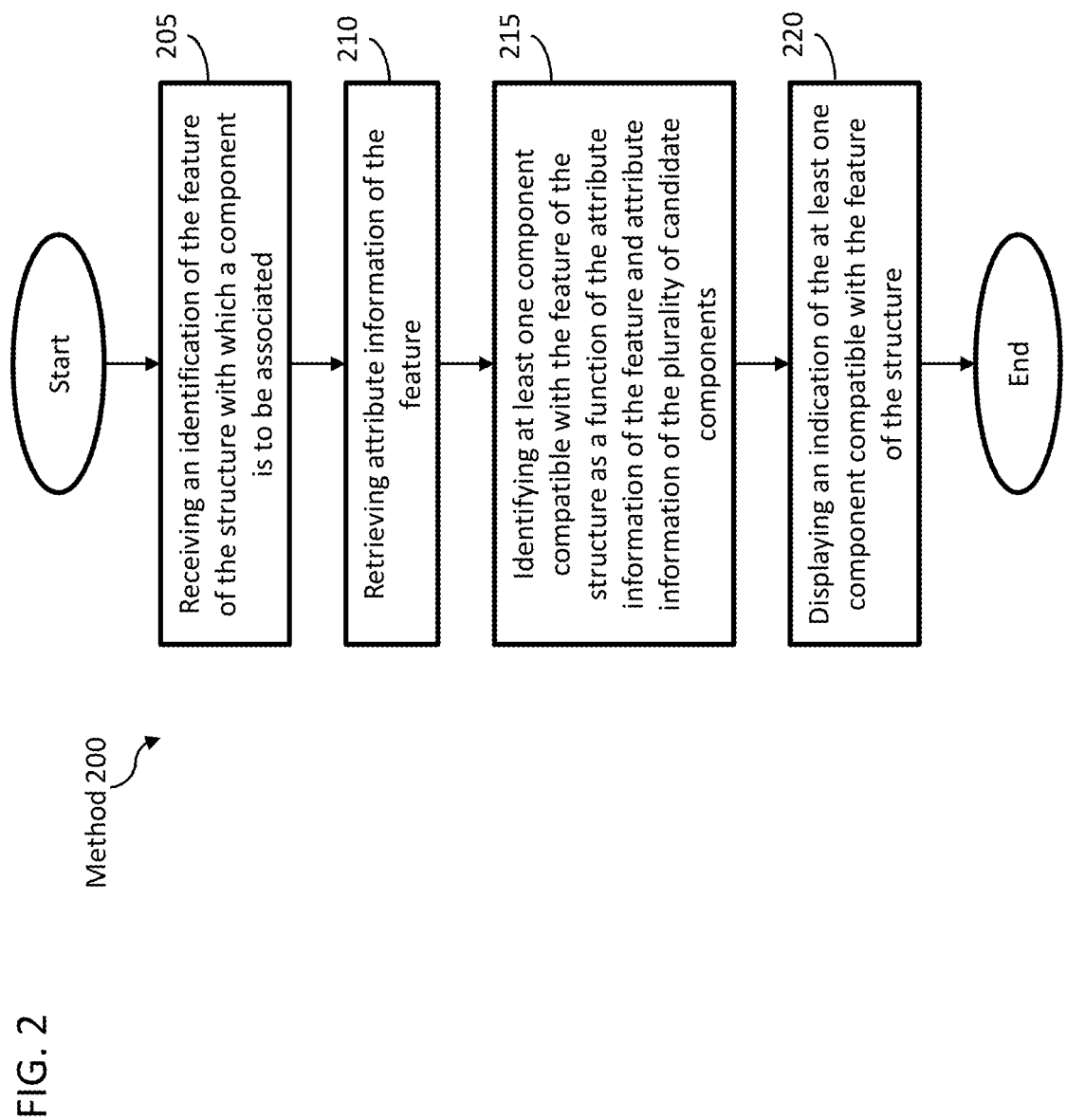
FIG. 2 is a flow diagram illustrating an exemplary method of assisting designers with selecting components compatible with features or structures represented in computer models.

Reference is now made to FIG. 2, and also to FIG. 1 for exemplary context. FIG. 2 illustrates an exemplary embodiment of a method 200 of assisting designers with selecting components compatible with features or structures represented in computer models that can be implemented, for example, by one or more components of compatible components system 100, as appropriate. At step 205, computer modeling software 104 may receive an identification of a feature of a structure with which a component is to be associated. In some embodiments, through GUI 108, a designer may identify the feature for software 104 by selecting a feature present in CAD model 112. For example, the designer may select a surface, an edge, or a mounting hole, among others. As introduced hereinabove, the designer may use computer modeling software 104 to add, specify, or otherwise associate features with CAD model 112 in creating the design of the structure. The designer may then, through GUI 108, issue a request to compatible component selection method 116 for compatible components design assistance.

In other embodiments of step 205, through computer modeling software 104 and GUI 108, the designer may identify CAD model geometry that contains one or more features. Computer modeling software 104 may read the feature(s) from CAD model 112 and present them to the designer in the form of a selectable list via GUI 108. The designer may then select a specific feature with which a component is to be associated.

At step 210, computer modeling software 104 may retrieve attribute information of the feature identified at step 205. In some embodiments, CAD model 112 may contain the attribute information and software 104 may retrieve the attribute fields and values directly from this CAD model information. The information retrieved may comprise all available attribute information associated with the feature or a subset thereof. In some embodiments, the subset of information may be dependent on specific component types of interest identified by the designer through GUI 108. By way of one example, a designer may furnish a request for only nuts, in which case computer modeling software 104 may retrieve only attribute information that may present compatibility issues with nuts. By way of another example, a designer may furnish a request for a specific type of stud (e.g., a concealed head stud), in which case computer modeling software 104 may retrieve only or at least the attribute information (e.g., sheet thickness) that impacts compatibility with this specific type of stud.

In other embodiments of step 210, computer modeling software 104 may prompt the designer to provide attribute information needed for purposes of components compatibility. By way of one example, compatible components systems may require the material type of a part, yet the CAD model may not have this information as the designer may fail to specify during structural design. In such cases, the identification of a feature at step 205 may include or be accomplished by system 100 prompting the designer to obtain such information before proceeding to step 215.

At step 215, compatible component selection method 116 may identify one or more candidate components 120 (i.e., components compatible with the designated feature) from one or more available libraries of components 124. In some embodiments, method 116 may compare feature attribute information extracted at step 210 against candidate component attribute information present in libraries 124. Based on the results of one or more comparisons, method 116 may select component(s) or component group(s) with attribute values that match feature attribute values. A match may refer to components and features that share the same attribute values, have attribute values within a predetermined acceptable tolerance, or other predefined rules regarding compatibility. Logic that automatedly determines compatibility between components and structural features frees designers from needing to manually check the compatibility between every desired component and the computer model under design.

At step 220, software 104 may display an indication of categories or subcategories of components or specific individual component parts that are compatible with the feature of the structure. In certain embodiments, compatible component selection method 116 may transmit candidate components 120 back to computer modeling software 104, whereby the software may provide the information to the designer, e.g., via GUI 108. In other embodiments, alternative output communication methods known to those skilled in the art, such as audio, audiovisual, tactile methods, etc., may be utilized to indicate compatible components to the designer.

In some embodiments, designers may input a selection of a component from among candidate compatible components identified at step 220. System 100 may then associate the designer-selected component with the feature(s) of the computer-modeled structure as described hereinabove. Additionally or alternatively, in some embodiments, designers may further filter the list of candidate compatible components. For example, some or all steps of method 200 may be executed in an iterative process to further refine the list of compatible components until a final component is selected. Such optional processes will be described further hereinbelow with reference to a specific example of the method as applied to sheet metal parts.

Figure 3:
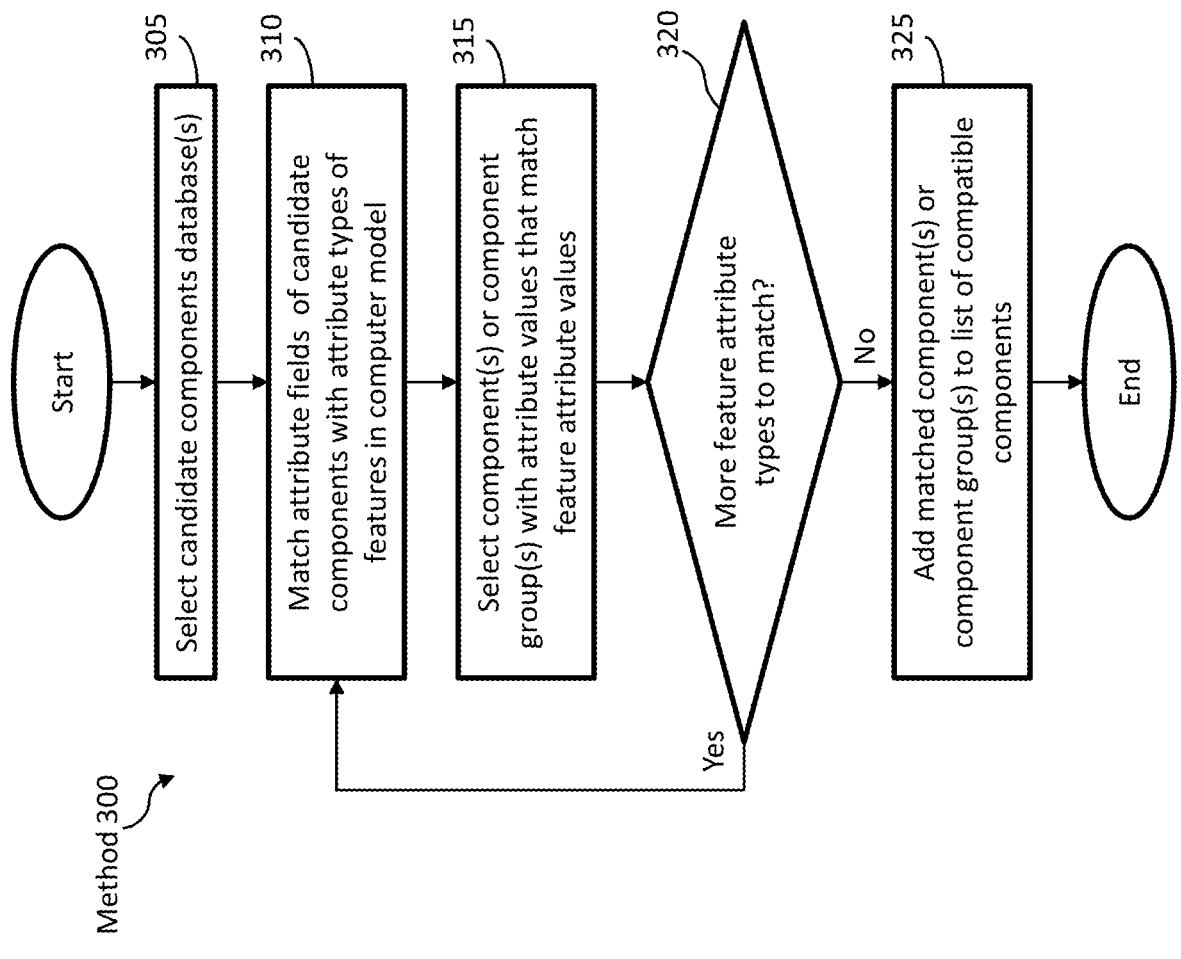
FIG. 3 is a flow diagram illustrating an exemplary method of identifying components compatible with features or structures represented in computer models.

Reference is now made to FIG. 3, and also to FIGS. 1 and 2 for exemplary context. FIG. 3 is a flow diagram illustrating an exemplary automated compatible component identification method 300. In some embodiments, compatible component selection method 116 may execute method 300 to automatedly identify components that are compatible with specific CAD model features. At step 305, method 116 may establish a connection to one or more candidate component libraries (e.g., library 124). In some embodiments in which the library takes the form of a database, method 116, acting as a client, may utilize middleware, such as Open Database Connectivity (ODBC), to connect and communicate with the candidate component library. Other connection methods may be utilized; for example, in compatible component system configurations involving multiple candidate component libraries, method 116 may utilize a plurality of different connection methods.

At step 310, method 116 may proceed to match one or more attribute field(s) of the structural feature against one or more corresponding attribute fields for each the components present in library 124. By way of one example, method 116 may apply logic that compares non-geometric attribute values of the structure against the non-geometric attribute values defined for each component. By way of another example, method 116 may apply logic that compares geometric attribute values of the structure against the geometric attribute values defined for each component. In some embodiments, such logic may utilize a predefined threshold to determine whether the component is compatible on the basis of particular attribute data, such as field pairs. The values of a component attribute field may be used as the threshold (e.g., the length from edge to hole on a face may have to be greater than a component's minimum distance hole to edge attribute value). In other embodiments, such logic may utilize an absolute or equivalent condition. For example, the logic may compare material type values.

At step 315, method 116 may select one or more components or component groups with attribute values that match feature attribute values, as determined at step 310. Method 116 may identify those components or component groups with a unique designation that signifies they are compatible based on matched feature attribute values. In some embodiments, at step 320, compatible component selection method 116 may determine whether there are additional matches between attribute fields of the structural feature and attribute fields of the components required to further narrow the compatible components list. If there are additional matches, method 116 may return to step 310 and the additional comparison is performed. If there are no additional matches to be made, method 116 may proceed to step 325, at which method 116 may add selected components or component groups, as determined at step 315, to a list of compatible components, such as compatible components 120.

For example, as part of step 325, for components determined to be compatible on the basis of one or more comparisons, method 116 may extract the components and/or unique indicators of the components from a library, such as candidate component library 124, and store them in a separate list or other data structure designed to identify compatible components, such as compatible components 120. Such a list may include, but is not necessarily limited to, component attribute data, component images, and/or component category or subcategory data. In some embodiments, method 300 may transmit the one or more lists of compatible components to computer modeling software. As described in method 200, computer modeling software may present such compatible components to designers, e.g., for inclusion in CAD models.

Exemplary Method Applied to Sheet Metal Parts

Figure 4:
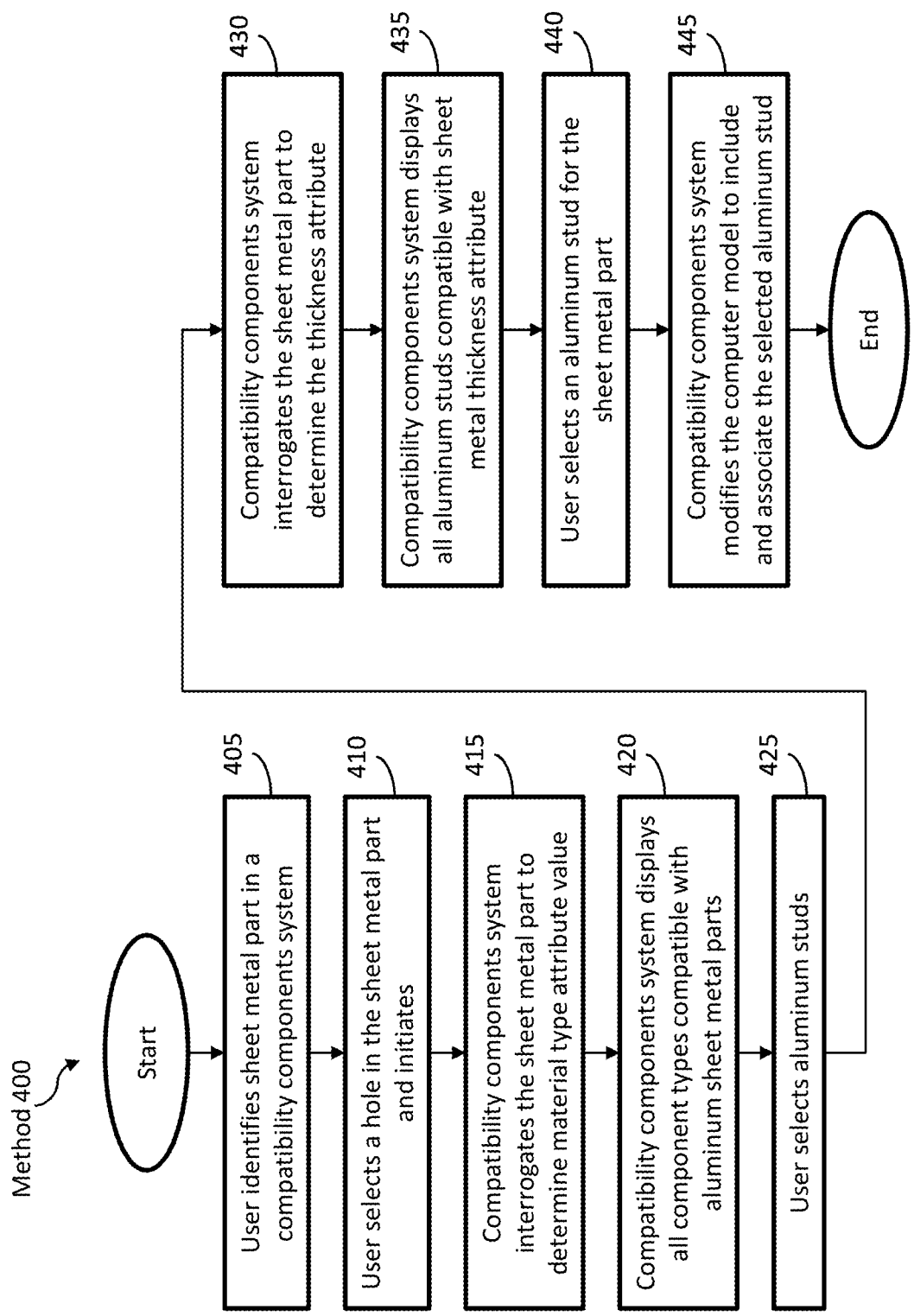
FIG. 4 is a flow diagram illustrating an exemplary method of using a compatible components system to add studs to sheet metal parts.

FIG. 4 illustrates an exemplary method 400 for applying the compatible components selection methods described herein in a scenario involving the computer-aided design of sheet metal assemblies. The following examples further illustrate how designers may utilize the methods described herein in iterative processes to identify and/or filter CAD model compatible components. In particular, the following examples further illustrate how compatible component systems may make different compatibility evaluations when designers select specific categories or subcategories of components.

When describing method 400, references will also be made to FIGS. 5, 6 and 7. FIG. 5 illustrates a series of representative screenshots depicting various aspects of an exemplary user interface that may be presented to sheet metal designers at various stages through method 400. FIGS. 6 and 7 are depictions of exemplary component library listings of studs that may be accessed and/or made available to sheet metal designers during execution of method 400.

At step 405 of method 400, a designer may identify a sheet metal part in a compatible components system. For example, the designer may invoke computer modeling software 104 and design a sheet metal part 504, a visual indication of which may be shown in a GUI, such as GUI 108 and/or GUI 500A, as illustrated in in FIG. 5. Alternatively, the designer may select a pre-existing sheet metal part, which may include feature(s) and attribute information associated with each feature. For example, as shown in FIG. 5, part 504 may include a hole 508 and a designation 512 indicating that aluminum is the desired type of material that a sheet metal fabricator should use in the fabrication of the part.

At step 410, the designer may select hole 508 in sheet metal part 504 and initiate a request to system 100 for compatible components design assistance. To initiate the request, for example, the designer may select a component selection system initiation button (not shown) in or associated with computer modeling software 104. In response to initiation, a compatible components selection method, such as compatible components selection method 116, may then monitor the designer's continued interaction with software 104 for any number of predetermined component-related selection events. For example, one such event may comprise the selection of any hole in the sheet metal part.

At step 415, system 100 may interrogate sheet metal part 504 to determine attribute information, such as one or more field values, that may impact compatibility with hardware components. For example, system 100 may read attribute field values associated with material type 512 and material thickness 516. As shown in FIG. 5, a selected feature information panel 520 may visually display selected feature and attribute value information to the designer. A component sourcing panel 524 may also present component sourcing options to the designer. For example, a designer may opt for system 100 to provide compatible components exclusively from the PEM hardware catalog.

At step 420, system 100 may display all component types compatible with aluminum sheet metal parts. To identify this information, system 100 may execute compatible component selection method 116 in response to designer request initiation. As illustrated in GUI 500A of FIG. 5, the designer may initiate the request by selecting a "Go" button 528. FIG. 6 provides a detailed example of a component library, which may include a stud library 600, of self-clinching studs that may be stored in one or more portions of a compatible components system, such as candidate components database 124. Some of these studs are compatible with aluminum sheet metal parts as indicated by fastener material type attribute 604 (in the case of aluminum, FHA indicates compatibility, while a dash indicates an incompatibility).

As illustrated in GUI 500B of FIG. 5, system 100 may utilize a compatible components panel 532 to determine and/or output specific categories (i.e., classes or groups or types) of components compatible with aluminum sheet metal parts. As illustrated in GUI 500B, panel 532 may display additional information about each category, such as a name, one or more component pictures, and one or more component categories. Although panel 532 in FIG. 5 displays only studs, a virtually limitless number of compatible component types.

At step 425, the designer may initiate a request to system 100 to return (e.g., through GUI 108) all aluminum studs that are compatible with hole 508; other categories of aluminum components may not be returned by the system. To initiate the request, for example, the designer may select a component type indicator 536 provided in panel 532 and select a "Filter" button 540. At step 430, system 100 may respond to the request by interrogating sheet metal part 504 to determine one or more values associated with the part's material thickness 516, which may be 0.05 inches thick, for example, as illustrated in FIG. 5.

At step 435, system 100 may output (e.g., display to GUI 108) a number of or all aluminum studs that are compatible with the thickness of part 504. For example, if a part identified by a user at step 405, such as part 504, has a thickness of 0.05 inches, then all studs output by system at step 435 will be compatible with a sheet thickness of 0.05 inches. As shown in GUI 500C of FIG. 5, the compatible aluminum studs 544 may be visually displayed to the designer via a compatible components panel 548. FIG. 7 provides a detailed example of a compatible components panel 700A that presents four specific studs that are compatible with sheet metal part 504. Each stud presented in the panel is compatible with both the material type and material thickness of part 504. Note that certain components present in a library may be compatible with one feature attribute but not all feature attributes. For example, the stud with thread size 0.250-20 designated with "FHA" (aluminum compatible) and "0420" (thread code) in FIG. 6 is an aluminum component, but because this component requires a 0.60 inch minimum material thickness, system 100 may consider this component incompatible and thus may not display it in panel 700A (FIG. 7).

At step 440, the designer may select an aluminum stud that they desire to add to sheet metal part 504. To provide this selection, for example, the designer may select a component selector 550 associated with the desired aluminum stud and then select an "Add" button 552. As illustrated in FIG. 7, in some embodiments, the designer may select a specific aluminum stud by length, for example, by selecting a user interface element, such as a button or selectable cell, located at the intersection of 0.375 inch length and aluminum stud thread code "440" in aluminum stud listing 700. Notably, in some embodiments, after step 435, a designer may continue to iteratively filter components (e.g., by returning to step 425) prior to the selection of the final components to be added to the CAD model. In some cases, designers may filter lists of candidate components six or more times before arriving at the appropriate component.

In some embodiments of the invention, system 100 may provide designers with the option to change or modify geometry in the CAD model based on a selected component. For example, as illustrated by the user interface element located near the bottom of FIG. 7, the designer may opt to change the size of a hole according to the hole size attribute information of the selected component. Illustrative embodiments for modifying CAD model geometry as a function of selected components may be found in, for example, U.S. patent application Ser. No. 14/195,391, filed on Mar. 3, 2014, and titled "HARDWARE-COMPONENT BASED GEOMETRIC MODIFICATIONS OF COMPUTER-MODELED PART DESIGNS", which is incorporated by reference herein.

At step 445, system 100 may modify computer model 108 to include and/or be associated with the selected aluminum stud, optionally including geometry representing the stud. For example, stud specific information may be written directly into computer model information. This information may include any of the illustrative attribute fields and values referenced herein, among others. As illustrated in GUI 500D of FIG. 5, a selected aluminum stud 556 may be visually displayed to demonstrate a relationship between the structure and the component. In some embodiments, as shown in GUI 500D, the component, in this case stud 556, may be displayed as being engaged with the feature of the structure (i.e., hole 508 of part 504).

Alternative System Embodiments

Figure 8:
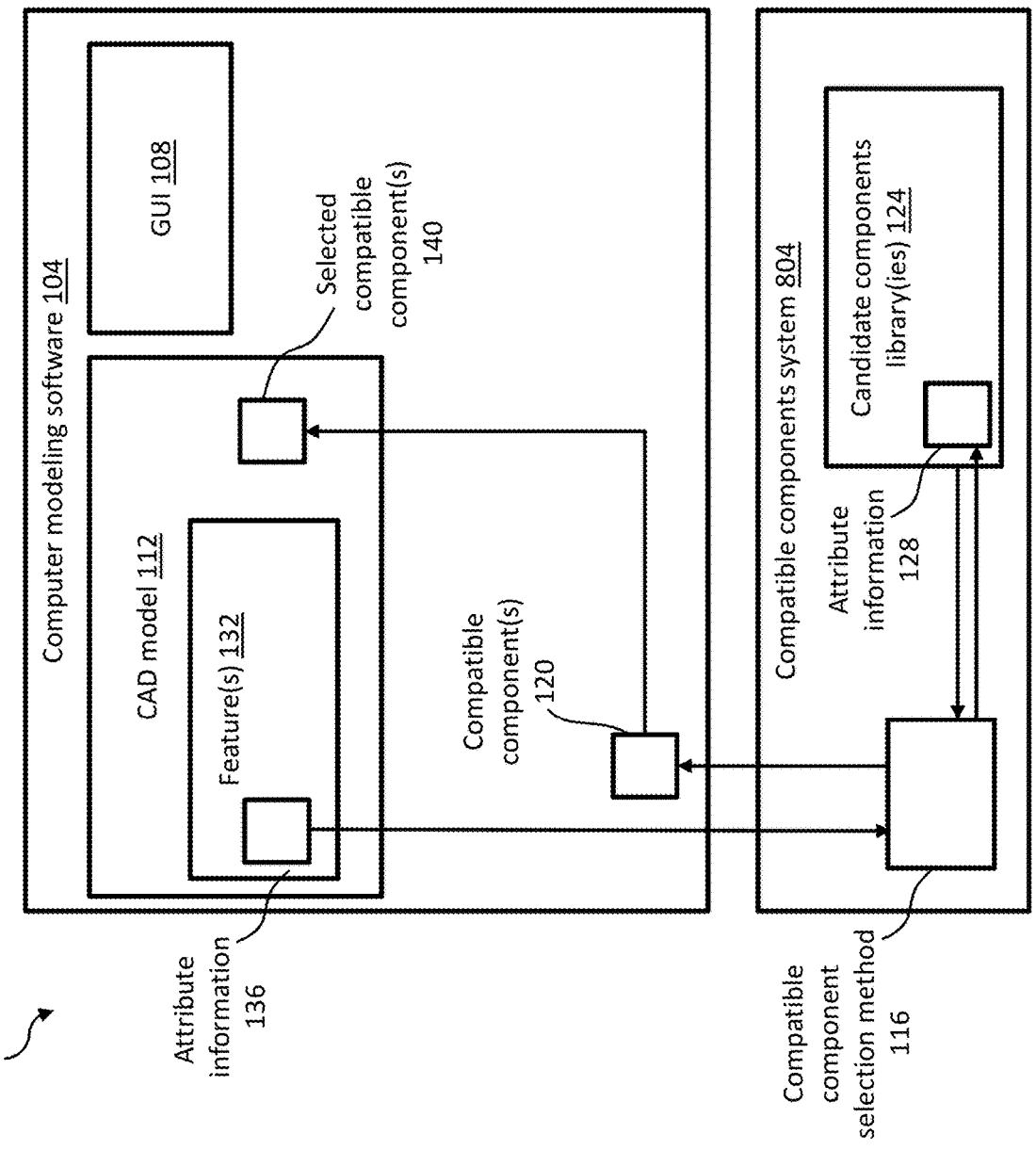
FIG. 8 is a high-level block diagram of a system for assisting designers with selecting components compatible with features of structures represented in computer models.

FIG. 8 illustrates an alternative embodiment of a system 800 for assisting designers with selecting components compatible with features of structures represented in computer models. System 800 illustrates a configuration in which a compatible component system 804 stores both the compatible component selection method 116 and one or more candidate component libraries 124. The compatible component system 804 and computer modeling software 104 are physically separate (e.g., in a distributed computing model) and may be operatively connected via a network (e.g., local area network, wide area network, and/or Internet connection). In operation, computer modeling software 104 may transmit attribute information 136 to method 116 over the network. After execution of method 116 to identify candidate components in library 124, method 116 may transmit candidate components 120 to the computer modeling software 104 over the network. In contrast to system 100 of FIG. 1, this particular system configuration embodiment may provide hardware component suppliers with individualized control over the rules and logic utilized to execute component compatibility decisions. For example, as hardware component suppliers add or modify hardware components and/or attribute data stored in library 124, additional rules and logic that indicate conditions when these components should be considered compatible with features of computer models may be added to method 116.

It is to be noted that any one or more of the aspects and embodiments described herein may be conveniently implemented using one or more machines (e.g., one or more computing devices that are utilized as a user computing device for an electronic document, one or more server devices, such as a document server) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate computing hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk (e.g., a conventional floppy disk, a hard drive disk), an optical disk (e.g., a compact disk "CD", such as a readable, writeable, and/or re-writable CD; a digital video disk "DVD", such as a readable, writeable, and/or rewritable DVD), a magneto-optical disk, a read-only memory "ROM" device, a random access memory "RAM" device, a magnetic card, an optical card, a solid-state memory device (e.g., a flash memory), an EPROM, an EEPROM, and any combinations thereof. A machine-readable medium, as used herein, is intended to include a single medium as well as a collection of physically separate media, such as, for example, a collection of compact disks or one or more hard disk drives in combination with a computer memory. As used herein, a machine-readable storage medium does not include a signal.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a personal digital assistant "PDA", a mobile telephone, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 9:
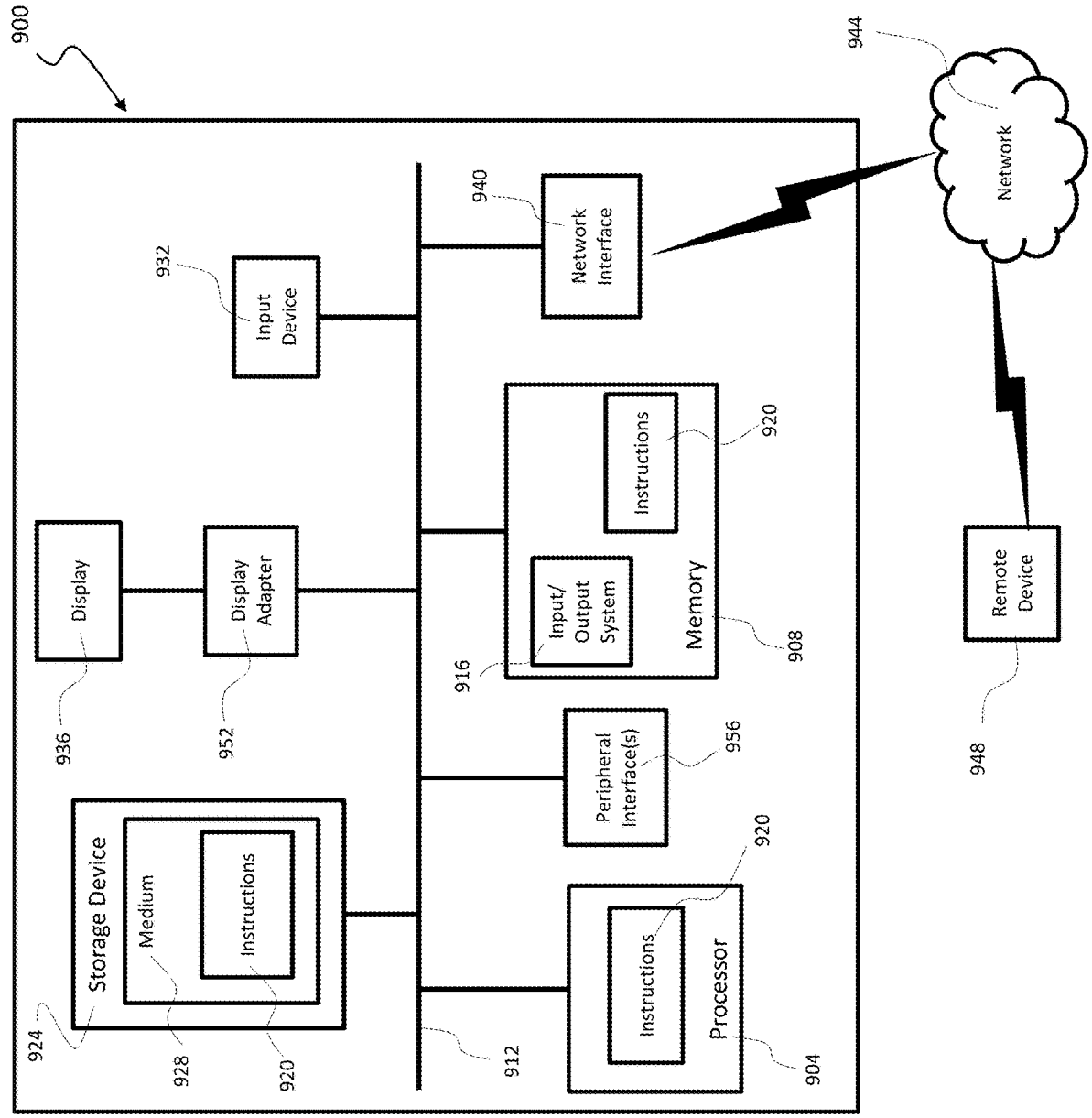
FIG. 9 is a block diagram of a computing system that can be used to implement any one or more of the methodologies disclosed herein and any one or more portions thereof.

FIG. 9 shows a diagrammatic representation of one embodiment of a computing device in the exemplary form of a computer system 900 within which a set of instructions for causing a control system, such as the compatible components system of FIG. 1, to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 900 includes a processor 904 and a memory 908 that communicate with each other, and with other components, via a bus 912. Bus 912 may include any of several types of bus structures including, but not limited to, a memory bus, a memory controller, a peripheral bus, a local bus, and any combinations thereof, using any of a variety of bus architectures.

Memory 908 may include various components (e.g., machine readable media) including, but not limited to, a random access memory component, a read only component, and any combinations thereof. In one example, a basic input/output system 916 (BIOS), including basic routines that help to transfer information between elements within computer system 900, such as during start-up, may be stored in memory 908. Memory 908 may also include (e.g., stored on one or more machine-readable media) instructions (e.g., software) 920 embodying any one or more of the aspects and/or methodologies of the present disclosure. In another example, memory 908 may further include any number of program modules including, but not limited to, an operating system, one or more application programs, other program modules, program data, and any combinations thereof.

Computer system 900 may also include a storage device 924. Examples of a storage device (e.g., storage device 924) include, but are not limited to, a hard disk drive, a magnetic disk drive, an optical disc drive in combination with an optical medium, a solid-state memory device, and any combinations thereof. Storage device 924 may be connected to bus 912 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 924 (or one or more components thereof) may be removably interfaced with computer system 900 (e.g., via an external port connector (not shown)). Particularly, storage device 924 and an associated machine-readable medium 928 may provide nonvolatile and/or volatile storage of machine-readable instructions, data structures, program modules, and/or other data for computer system 900. In one example, software 920 may reside, completely or partially, within machine-readable medium 928. In another example, software 920 may reside, completely or partially, within processor 904.

Computer system 900 may also include an input device 932. In one example, a user of computer system 900 may enter commands and/or other information into computer system 900 via input device 932. Examples of an input device 932 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 932 may be interfaced to bus 912 via any of a variety of interfaces (not shown) including, but not limited to, a serial interface, a parallel interface, a game port, a USB interface, a FIREWIRE interface, a direct interface to bus 912, and any combinations thereof. Input device 932 may include a touch screen interface that may be a part of or separate from display 936, discussed further below. Input device 932 may be utilized as a user selection device for selecting one or more graphical representations in a graphical interface as described above.

A user may also input commands and/or other information to computer system 900 via storage device 924 (e.g., a removable disk drive, a flash drive, etc.) and/or network interface device 940. A network interface device, such as network interface device 940, may be utilized for connecting computer system 900 to one or more of a variety of networks, such as network 944, and one or more remote devices 948 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 944, may employ a wired and/or a wireless mode of communication. In general, any network topology may be used. Information (e.g., data, software 920, etc.) may be communicated to and/or from computer system 900 via network interface device 940.

Computer system 900 may further include a video display adapter 952 for communicating a displayable image to a display device, such as display device 936. Examples of a display device include, but are not limited to, a liquid crystal display (LCD), a cathode ray tube (CRT), a plasma display, a light emitting diode (LED) display, and any combinations thereof. Display adapter 952 and display device 936 may be utilized in combination with processor 904 to provide graphical representations of aspects of the present disclosure. In addition to a display device, computer system 900 may include one or more other peripheral output devices including, but not limited to, an audio speaker, a printer, and any combinations thereof. Such peripheral output devices may be connected to bus 912 via a peripheral interface 956. Examples of a peripheral interface include, but are not limited to, a serial port, a USB connection, a FIREWIRE connection, a parallel connection, and any combinations thereof.

As would be apparent to one reasonably skilled in the art, the invention described herein may be applied to other manufacturing types, including but not limited to the manufacture of apparel. Both sheet metal and apparel designers use CAD systems to design their products, using sheets of flat material for manufacture. Features and attribute information may be embedded within the digital design. Designers may choose different metals or fabrics (including non-woven materials such as leather) depending on the strength and other inherent properties of the material, which affects what components may be compatible with the material.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

What is claimed is:

1. A method of assisting a designer with selecting a component compatible with a feature of a structure represented in a computer model, said method being carried out by a compatible components system programmed to carry out the steps of the method, the method comprising:

receiving a computer assisted design (CAD) model containing a representation of the structure, the representation of the structure further including the feature;

receiving, from a designer, an identification of the feature of the structure with which the component is to be associated;

interrogating the CAD model to extract first attribute information of the feature from the CAD model, the first attribute information belonging to a first type of attribute information;

retrieving, from at least a candidate component library a plurality of component types, wherein each component type of the plurality of component types is compatible with the first attribute information;

displaying the plurality of component types to the designer;

receiving, from the designer:
  a selection of a component type of the plurality of component types;
  an identification of a second attribute type; and
  a command to filter components according to the second attribute type;

interrogating the CAD model to extract second attribute information of the feature from the CAD model, the second attribute information belonging to the second attribute type;

retrieving, from at least a candidate component library, a plurality of candidate components belonging to the component type;

from among the plurality of candidate components, identifying at least one component compatible with the feature of the structure, wherein identifying the at least one component further comprises:
  performing a filtering operation, wherein performing the filtering operation further comprises, for each candidate component of the plurality of candidate components:
    identifying component attribute information of the candidate component, wherein the component attribute information belongs to the second attribute type;
    comparing the component attribute information to the second attribute information; and
    eliminating the candidate component from the plurality of candidate components if the first component attribute information is not compatible with the second attribute information;

displaying the at least one compatible component compatible with the feature of the structure to a designer;

receiving, from the designer, a selection of a chosen component from the at least one component compatible with the feature of the structure; and modifying the CAD model to include the chosen component combined with the feature, wherein modifying the CAD model further comprises:
   identifying at least a dimension of the feature that does not match at least a dimension of the component;
   modifying the CAD model to match the at least a dimension of the feature of the structure to the at least a dimension of the component;
   identifying a plurality of matching features, each matching feature of the plurality of features matching the feature of the structure;
   modifying the CAD file to indicate the plurality of matching features by modifying a display color of each feature of the plurality of matching features to a first color;
   receiving from the user a selection of at least a matching feature, of the plurality of matching features, to modify;
   modifying the CAD file to indicate the at least a matching feature by modifying a display color of the at least a matching feature to a second color;
   receiving a user command to modify the at least a matching feature; and
   modifying the CAD file to match at least a dimension of the at least a matching feature to at least a dimension of the component and to combine a component matching the component with each feature of the at least a matching feature.

2. A method according to claim 1, wherein the feature of the structure is a discrete piece of geometry.

3. A method according to claim 2, wherein the discrete piece of geometry is a face, a hole, or an edge.

4. A method according to claim 1, wherein the feature identifies whether the structure is part of an assembly.

5. A method according to claim 1, wherein at least one of the first attribute information and the second attribute information comprises a nongeometric attribute of the feature.

6. A method according to claim 5, wherein the nongeometric attribute is a type of material of the feature.

7. A method according to claim 1, wherein at least one of the first attribute information and the second attribute information comprises a geometric attribute of the feature.

8. A method according to claim 7, wherein the geometric attribute is a thickness of the feature.

9. A method according to claim 1, further comprising:
   displaying at least a portion of the CAD model, including the chosen component, in order to demonstrate a relationship between the structure and the chosen component.

10. A method of selecting a component compatible with a feature of a structure represented in a computer model using automated component identification, said method being carried out by a compatible components system programmed to carry out the steps of the method, the method comprising:
   receiving a computer assisted design (CAD) model containing a representation of the structure;
   receiving an identification of the feature of the structure, the feature represented in the CAD model, with which the component is to be associated;
   extracting first attribute information of the feature from the CAD model, wherein the first attribute information comprises a plurality of attribute types;
   retrieving, from at least a candidate component library, a first plurality of candidate components;
   generating a second plurality of candidate components, wherein generating the second plurality of candidate components further comprises filtering the first plurality of candidate components using the first attribute information;
   iteratively filtering the second plurality of candidate components until a single component is selected, wherein iteratively filtering includes:
      displaying the second plurality of components to a designer;
      receiving a designer entry of an additional attribute type;
      extracting, from the CAD model, feature attribute information corresponding to the additional attribute type;
      comparing, for each candidate component of the second plurality of candidate components, component attribute information corresponding to the additional attribute type to the feature attribute information corresponding to the additional attribute type; and
      removing, from the second plurality of candidate components, each candidate component of the second plurality of candidate components that has component attribute information that is not compatible with the feature attribute information; and
   modifying the CAD model to include the single component combined with the feature, wherein modifying the CAD model further comprises:
      identifying at least a dimension of the feature that does not match at least a dimension of the component;
      modifying the CAD model to match the at least a dimension of the feature of the structure to the at least a dimension of the component;
      identifying a plurality of matching features, each matching feature of the plurality of features matching the feature of the structure;
      modifying the CAD file to indicate the plurality of matching features by modifying a display color of each feature of the plurality of matching features to a first color;
      receiving from the user a selection of at least a matching feature, of the plurality of matching features, to modify;
      modifying the CAD file to indicate the at least a matching feature by modifying a display color of the at least a matching feature to a second color;
      receiving a user command to modify the at least a matching feature; and
      modifying the CAD file to match at least a dimension of the at least a matching feature to at least a dimension of the component and to combine a component matching the component with each feature of the at least a matching feature.

11. A method of assisting a designer with selecting a component compatible with a feature of a structure represented in a computer model, said method being carried out by a compatible components system programmed to carry out the steps of the method, the method comprising:
   receiving a computer assisted design (CAD) model containing a representation of the structure, the representation of the structure further including the feature, wherein the CAD model and representation of the feature were previously generated;
   receiving, from a designer:
      an identification of the feature of the structure; and
      a selection of a component to be combined with the feature;

interrogating the CAD model to extract feature attribute information from the CAD model, wherein the attribute information includes at least a geometric characteristic of the feature;
retrieving, from at least a candidate component library, component attribute information corresponding to the component to be combined with the feature, wherein the component attribute information further comprises at least a geometric characteristic of the component;
determining that the component attribute information does not match the feature attribute information;
automatedly modifying geometry of the feature in the CAD file to match the component attribute information; and
modifying the CAD model to include the chosen component combined with the feature, wherein modifying the CAD model further comprises:
  identifying at least a dimension of the feature that does not match at least a dimension of the component;
  modifying the CAD model to match the at least a dimension of the feature of the structure to the at least a dimension of the component;
  identifying a plurality of matching features, each matching feature of the plurality of features matching the feature of the structure;
  modifying the CAD file to indicate the plurality of matching features by modifying a display color of each feature of the plurality of matching features to a first color;
  receiving from the user a selection of at least a matching feature, of the plurality of matching features, to modify;
  modifying the CAD file to indicate the at least a matching feature by modifying a display color of the at least a matching feature to a second color;
  receiving a user command to modify the at least a matching feature; and
  modifying the CAD file to match at least a dimension of the at least a matching feature to at least a dimension of the component and to combine a component matching the component with each feature of the at least a matching feature.

* * * * *